US012022838B1

(12) United States Patent
Friesen et al.

(10) Patent No.: US 12,022,838 B1
(45) Date of Patent: Jul. 2, 2024

(54) FROZEN BLOCK SEPARATION SYSTEM

(71) Applicant: Friesen's Inc., Detroit Lakes, MN (US)

(72) Inventors: Brett A. Friesen, Detroit Lakes, MN (US); Jacob E. Baer, Detroit Lakes, MN (US); Stephen R. Anderson, Detroit Lakes, MN (US); Ron A. Doll, Detroit Lakes, MN (US); Dan M. Evenson, Detroit Lakes, MN (US); Malachi V. Kaiser, Detroit Lakes, MN (US)

(73) Assignee: Friesen's Inc., Detroit Lakes, MN (US)

( * ) Notice: Subject to any disclaimer, the term of this patent is extended or adjusted under 35 U.S.C. 154(b) by 0 days.

(21) Appl. No.: 18/509,680

(22) Filed: Nov. 15, 2023

(51) Int. Cl.
*A22C 17/00* (2006.01)

(52) U.S. Cl.
CPC ...... *A22C 17/0006* (2013.01); *A22C 17/0093* (2013.01)

(58) Field of Classification Search
CPC .................................................. A22C 17/0006
USPC .......................................................... 83/167
See application file for complete search history.

(56) References Cited

U.S. PATENT DOCUMENTS

| 1,508,778 | A | | 9/1924 | Doering | |
|---|---|---|---|---|---|
| 3,502,231 | A | | 3/1970 | Raynor | |
| 3,797,343 | A | * | 3/1974 | Miller | B26D 7/32 |
| | | | | | 83/714 |
| 3,821,913 | A | * | 7/1974 | Bajcar | B26D 7/32 |
| | | | | | 83/73 |
| 4,108,030 | A | * | 8/1978 | Griswold | B26D 7/32 |
| | | | | | 83/77 |
| 4,326,439 | A | * | 4/1982 | Frost | B65G 57/20 |
| | | | | | 414/931 |
| 4,377,958 | A | * | 3/1983 | Leighton | G01N 1/06 |
| | | | | | 83/915.5 |
| 4,423,995 | A | | 1/1984 | Karis | |
| 4,548,108 | A | * | 10/1985 | Dennis | B26D 5/32 |
| | | | | | 83/13 |
| 5,205,705 | A | * | 4/1993 | Jenkner | B23Q 3/002 |
| | | | | | 144/356 |
| 5,282,404 | A | * | 2/1994 | Leighton | G05B 19/401 |
| | | | | | 83/13 |
| 5,551,326 | A | * | 9/1996 | Goodman | G01N 1/06 |
| | | | | | 83/167 |
| 5,761,977 | A | * | 6/1998 | Jakobi | G01N 1/06 |
| | | | | | 83/13 |

(Continued)

OTHER PUBLICATIONS https://chlsystems.com/frozen-block-separator/; CHL Systems Frozen Block Separator Webpage; Apr. 28, 2023.

(Continued)

*Primary Examiner* — Sean M Michalski
(74) *Attorney, Agent, or Firm* — Neustel Law Offices

(57) ABSTRACT

A frozen block separation system is disclosed herein. An example system includes a product receptacle having an elevator and an opening configured to receive a frozen product in a stacked block format and elevate the frozen product to a cutting height, a cutting member positioned above the product receptacle, the cutting member configured to move perpendicularly to the frozen product and remove a portion of the frozen product when the frozen product is at the cutting height, and a first plate that is configured to move the portion in a first direction, from the cutting member into a batch enclosure.

20 Claims, 9 Drawing Sheets

(56) References Cited

U.S. PATENT DOCUMENTS

| | | | |
|---|---|---|---|
| 6,434,965 B1 | 8/2002 | Hughes | |
| 6,796,142 B2 | 9/2004 | Burn | |
| 7,861,629 B2 * | 1/2011 | Brander | B26D 7/32 |
| | | | 83/167 |
| 9,074,813 B2 | 7/2015 | Staughton | |
| 11,717,001 B1 * | 8/2023 | Liu | B65B 43/22 |
| | | | 83/156 |
| 2009/0101026 A1 * | 4/2009 | Gutierrez Artola | B26D 7/0683 |
| | | | 83/109 |
| 2010/0180778 A1 * | 7/2010 | Walker | B26D 3/28 |
| | | | 83/167 |
| 2010/0275792 A1 * | 11/2010 | Brown | B26D 3/185 |
| | | | 83/167 |
| 2011/0209439 A1 * | 9/2011 | Actis | B26D 1/03 |
| | | | 53/111 R |
| 2012/0045790 A1 * | 2/2012 | Van Dijk | G01N 1/04 |
| | | | 382/128 |
| 2014/0033886 A1 * | 2/2014 | Hoover | B26D 7/26 |
| | | | 83/365 |

OTHER PUBLICATIONS https://www.youtube.com/watch?v=sQVZb9mofG0; CHL Systems YouTube Video Webpage for "CHL Frozen Block Separator" and Screenshots Thereof; Oct. 18, 2021.

* cited by examiner

FROZEN BLOCK SEPARATION SYSTEM

CROSS-REFERENCE TO RELATED APPLICATIONS

Not applicable to this application.

STATEMENT REGARDING FEDERALLY SPONSORED RESEARCH OR DEVELOPMENT

Not applicable to this application.

FIELD

The described example embodiments in general relate to an apparatus for separating a frozen product into portions. In some instances, the frozen block is a meat product comprised of a plurality of individual units arranged in a stacked block format. The apparatus can elevate the frozen block to a cutting height where a cutting member is actuated to slice off a portion of the frozen block and hold the same until the portion is moved to a batch receptacle.

SUMMARY

According to some embodiments, the present disclosure is directed to a frozen block separator (hereinafter "apparatus"). An example apparatus includes a product receptacle having an elevator and an opening configured to receive a frozen product in a stacked block format and elevate the frozen product to a cutting height; a cutting member positioned above the product receptacle, the cutting member configured to move perpendicularly to the frozen product and remove a portion of the frozen product when the frozen product is at the cutting height; and a first plate that is configured to move the portion in a first direction, from the cutting member into a batch enclosure. Other embodiments of this aspect include a human-machine interface or other computer systems, apparatus, and computer programs recorded on one or more computer storage devices, each configured to perform the actions of the methods.

Implementations may include one or more of the following features. The apparatus may include a second plate that is configured to move the portion in a second direction, out of the batch enclosure. The cutting member may include a cutting edge, a body portion that supports the portion of the frozen product, and a drive mechanism for moving the cutting member perpendicularly to the frozen product. The cutting edge is spaced apart from the body portion and joined to the body portion at attachment points that form apertures between the cutting edge and the body portion.

The body portion is coplanar with a bottom of the batch enclosure. After the cutting member has cut the portion of the frozen product, the portion is supported by the body portion. The cutting height is based on the size of the portion that is to be removed from the frozen product. The apparatus may include a camera providing a view of the frozen product once the frozen product has been elevated to the cutting height.

The apparatus may include a human-machine interface (HMI) having a processor and memory, the processor executing instructions stored in the memory to: cause the elevator to move between a loading height and the cutting height based on input from a user that includes one of the plurality of selectable cutting heights; and cause the cutting member to extend and retract. The HMI receives the input from the user that is used to fine-tune the cutting height.

The HMI is configured to actuate the opening of a door associated with the batch enclosure, the door being opened as a second plate moves the portion in a second direction, out of the batch enclosure. The frozen product is meat and the apparatus is constructed from stainless steel to allow for sanitization of the apparatus. The apparatus may include a catch plate positioned underneath the cutting member and outside of the product receptacle, the catch plate being configured to direct loose pieces of the frozen product back into the product receptacle. Implementations of the described techniques may include hardware, a method or process, or computer software on a computer-accessible medium.

One general aspect includes a method of cutting a frozen product. The method also includes placing a first frozen product in a stacked block format into a product receptacle having an elevator. The method also includes elevating the first frozen product from a loading height to a cutting height. The method also includes moving a cutting member to cut a first portion of the first frozen product. The method also includes pushing the first portion in a first direction, from the cutting member into a batch enclosure with a first plate. Other embodiments of this aspect include corresponding computer systems, apparatus, and computer programs recorded on one or more computer storage devices, each configured to perform the actions of the methods.

Implementations may include one or more of the following features. The method can include causing the elevator to move and place the first frozen product at the cutting height. The method may include: lowering the elevator to the loading height; removing a remainder of the first frozen product; loading a second frozen product onto the elevator; moving the second frozen product to a second cutting height; moving the cutting member so as to cut a second portion of the second frozen product; moving the second portion of the second frozen product in the first direction, from the cutting member into a batch enclosure with the first plate; and moving both the first portion of the first frozen product and the second portion of the second frozen product out of the batch enclosure with a second plate.

The method may include obtaining a view of the first frozen product at the cutting height. The method may include: receiving user input via a human-machine interface for selecting the cutting height; and fine-tuning the cutting height; and adjusting the elevation of the first frozen product in accordance with the user input.

The method may include causing the actuation of a door associated with the batch enclosure prior to moving the first portion of the first frozen product and the second portion of the second frozen product out of the batch enclosure. Implementations of the described techniques may include hardware, a method or process, or computer software on a computer-accessible medium.

There have thus been outlined, rather broadly, some of the embodiments of the present disclosure in order that the detailed description thereof may be better understood, and in order that the present contribution to the art may be better appreciated. There are additional embodiments that will be described hereinafter and that will form the subject matter of the claims appended hereto.

In this respect, before explaining at least one embodiment in detail, it is to be understood that the various embodiments are not limited in their application to the details of construction or to the arrangements of the components set forth in the following description or illustrated in the drawings. Also, it is to be understood that the phraseology and terminology employed herein are for the purpose of the description and should not be regarded as limiting.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless there is evidence to the contrary from the description, where elements in different figures use identical reference numbers, the elements are generally either identical or at least similar in function or purpose.

DETAILED DESCRIPTION

A. Overview

Figure 1:
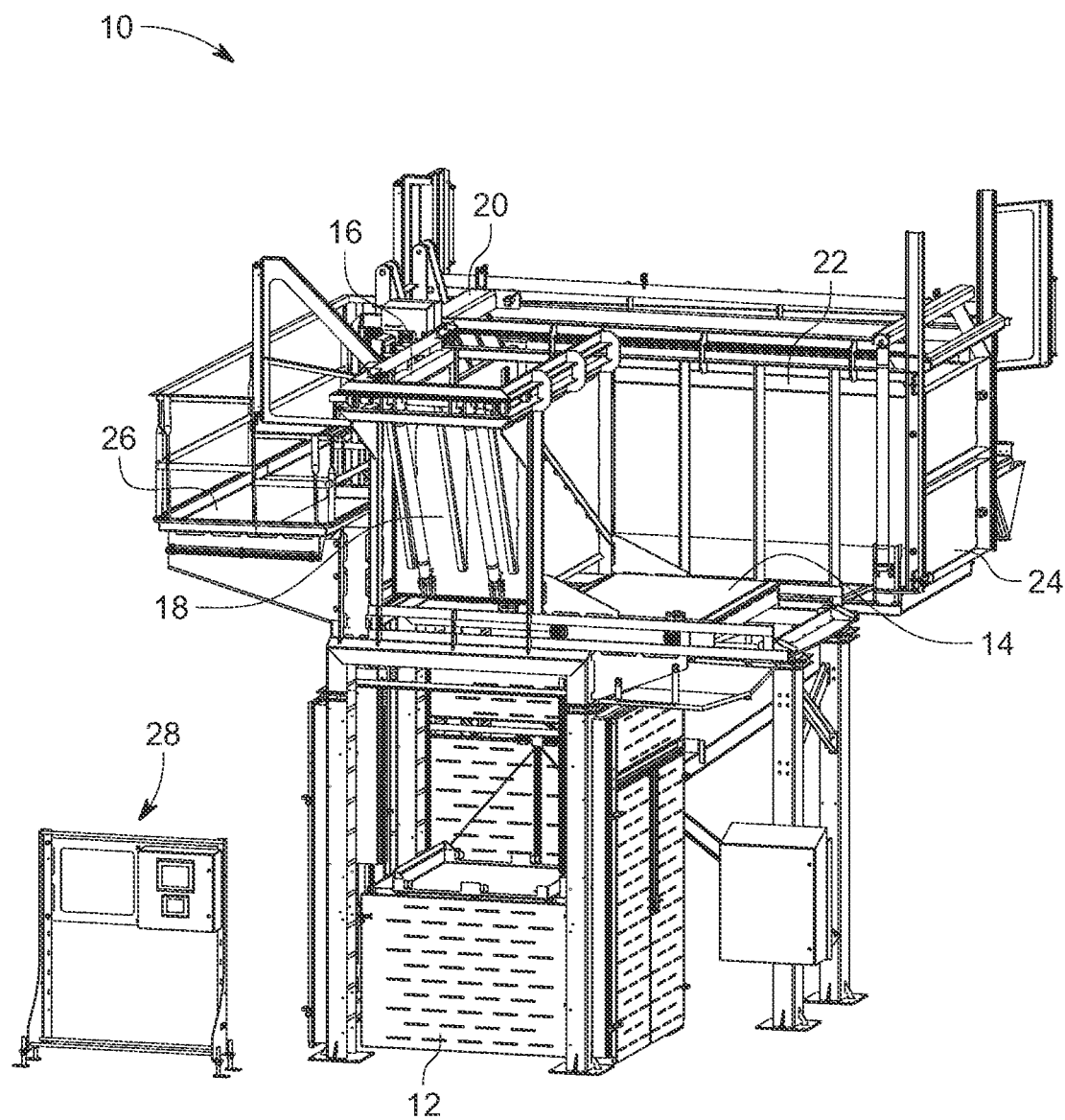
FIG. 1 is a perspective view of an apparatus in accordance with an example embodiment.

Some of the various embodiments of the present disclosure relate to an apparatus that is capable of portioning frozen blocks and batching the same for further processing. The apparatus can be used for portioning meat products for use in the pet food industry, as an example. Pet food manufacturers often use frozen meat blocks to make pet food. The apparatus can be used to separate the frozen meat blocks into smaller portions, which can then be used to make pet food. The apparatus is more efficient and safer than traditional methods, as it can separate blocks of frozen meat more accurately. Additionally, the apparatus produces more consistent portions, which is important for quality control. This is in contrast with current methods which may include separating the blocks from the larger frozen block using the forks of a forklift, which is a blunt and inaccurate method. The apparatus can be made of a durable material, such as stainless steel, that can withstand the cold temperatures of the frozen meat blocks. The apparatus can be made from a material such as stainless steel that is food grade and can be sterilized easily.

The apparatus comprises a platform (referred to as a product receptacle) for receiving a stacked block of frozen meat. While stacked blocks have been disclosed, other configurations of frozen meat products can also be processed, including a solid or monolithic unit. In some instances, the product receptacle has an opening configured to receive a blocks of frozen meat blocks and an elevator that can elevate the blocks of frozen meat blocks from a loading height to a cutting height, and the elevator can be moved between the loading height to the cutting height. Once the blocks of frozen meat have been cut/portioned, the elevator can be moved back to the loading height to remove the remainder of the blocks of frozen meat blocks.

A cutting member is part of the apparatus and comprises a blade that can extend into the blocks of frozen meat blocks. The blade is made of a material, such as stainless steel, that can cut through the frozen meat blocks. The blade is translated to cut through the frozen meat blocks, separating a portion of the frozen meat blocks from the remainder. After the block has been cut, the portion rests on top of a body of the cutting member.

The portion is then moved to a staging area, referred to as a batch receptacle where the separated portion can be held temporarily. The batch receptacle is also made of a durable material, such as stainless steel. To create batches that can be further processed into feed, two or more different types of frozen meats can be portioned and moved into the batch receptacle. Once aggregated, the separated portions can be moved out of the batch receptacle for further processing, such as grinding.

The machine includes an HMI (Human Machine Interface) and controller that can be used to control operations based on human input. In some instances, the product receptacle has indicia thereon that demark different possible cutting heights. It will be understood that the cutting height correlates with the resulting portion sizing once the frozen product is cut. The user can input one of the possible cutting heights into the HMI and the elevator is moved to the selected cutting height. To be sure, the cutting height that is selected by the user is based, at least partially, on a size of the frozen product that needs to be removed. For example, the cutting height is selected so that 100 pounds of the frozen product are cut and removed from the blocks. The user can fine-tune this level using a video that captures a view of the frozen product relative to a cutting member. For example, after the frozen product is moved to the cutting height, user input from a virtual or physical I/O device can be used to fine-tune the cutting height, such as moving the frozen product slightly up or down.

Once the cutting height has been selected, the cutting member is actuated to move perpendicularly to the frozen product and cut the same to remove a portion of the frozen product. A hydraulically activated plate is configured to move the portion into a batch enclosure. As noted above, the method can be repeated for other frozen products prior to pushing the batches of separated products out of the batch enclosure via a second hydraulically activated plate.

B. Example Embodiments

FIG. 1 is a perspective view of an apparatus 10 of the present disclosure. The apparatus 10 includes a product receptacle 12, a cutting member 14, a cutting enclosure 16, a first plate 18, a second plate 20, a batch enclosure 22, a door 24, a scaffold platform 26, and a human-machine interface (HMI) 28.

Figure 2:
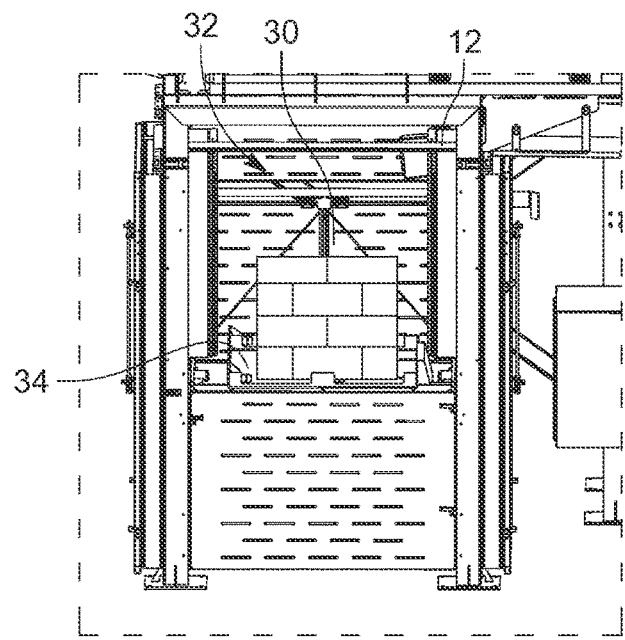
FIG. 2 is a close-up perspective view of the product receptacle and elevator.
Figure 3:
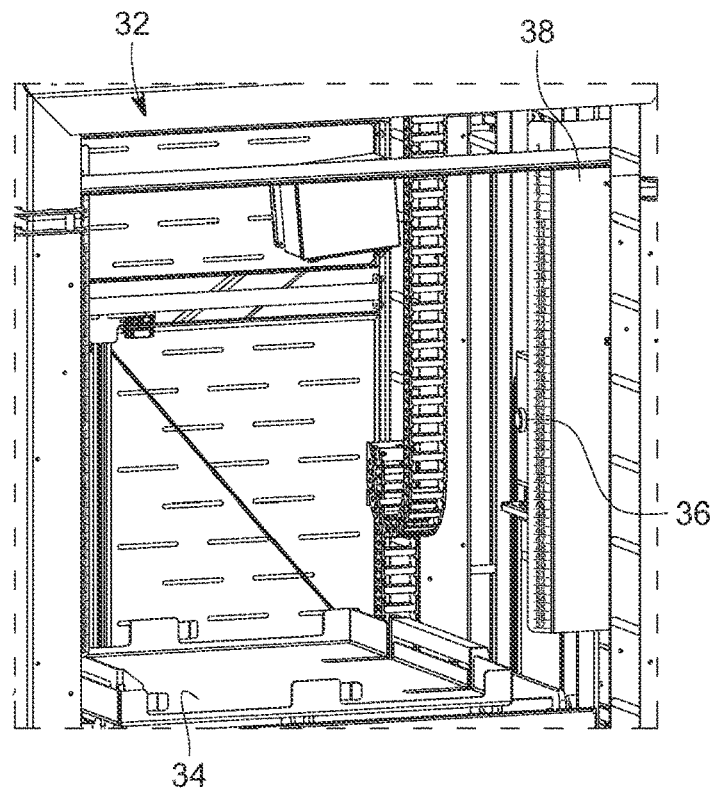
FIG. 3 is another close-up perspective view of the product receptacle and elevator, showing cutting height indicia.

Referring now to FIGS. 2 and 3 collectively, a user can move blocks of frozen meat (referred to hereinafter as blocks 30) into the product receptacle 12 through an opening 32. The blocks 30 are placed onto an elevator 34 when the elevator 34 is at a loading height. The elevator 34 can be moved using a drive mechanism 36, such as a belt drive. The belt drive is an example of a mechanism that could be used; however, this example is not intended to be limiting and could be substituted for another mechanism such as a hydraulic cylinder, scissor lift, and/or another mechanism that would be known to one of ordinary skill in the art.

The product receptacle 12 includes a reference guide that includes indicia 38 thereon. The indicia 38 demark available cutting heights. That is, each demarcation can correspond to a distinct cutting height. The indicia 38 are referenced by a user to select a gross cutting height. In sum, the indicia can be printed inside the product receptacle to indicate to a user a plurality of selectable cutting heights. The cutting height is chosen from the plurality of selectable cutting heights, and the cutting height is based on a size of the portion that is to be removed from the frozen product.

In some instances, the dimensions or size of the blocks 30 and the portion that blocks is to be removed dictate the cutting height. For example, if the blocks 30 have a size of four feet wide, six feet tall, by four feet deep, and 25% of frozen meat blocks 30 are to be removed (could be measured by weight or dimension as well), that may correspond to a cutting height. Again, this is just an example and is not intended to be limiting.

Thus, that cutting height can be used to select a gross cutting height. The cutting height can be inputted into the HMI 28 (see FIG. 1) or could also be determined from input of the dimensions of the blocks and the amount to be removed. This could be automated or determined through sensors such as cameras, infrared sensors, ultrasonic sensors, and the like.

Once the elevator has been moved to the gross cutting height, the cutting height can be fine-tuned by a user. In some instances, a camera 40 (see FIG. 9) can be positioned so as to capture a view of the blocks 30 relative to the cutting member 14. The user can adjust the height of the blocks up or down by input into the HMI 28 (see FIG. 1 and FIG. 9) or another input mechanism such as a joystick or equivalent. Upon selecting and fine-tuning the cutting height, the cutting member 14 can be engaged to cut a portion from the blocks. Other methods of sliding may also be used, not just wheels. That is, the wheel 49 and track is an example of a mechanism that could be used; however, this example is not intended to be limiting and could be substituted for another mechanism.

Figure 4:
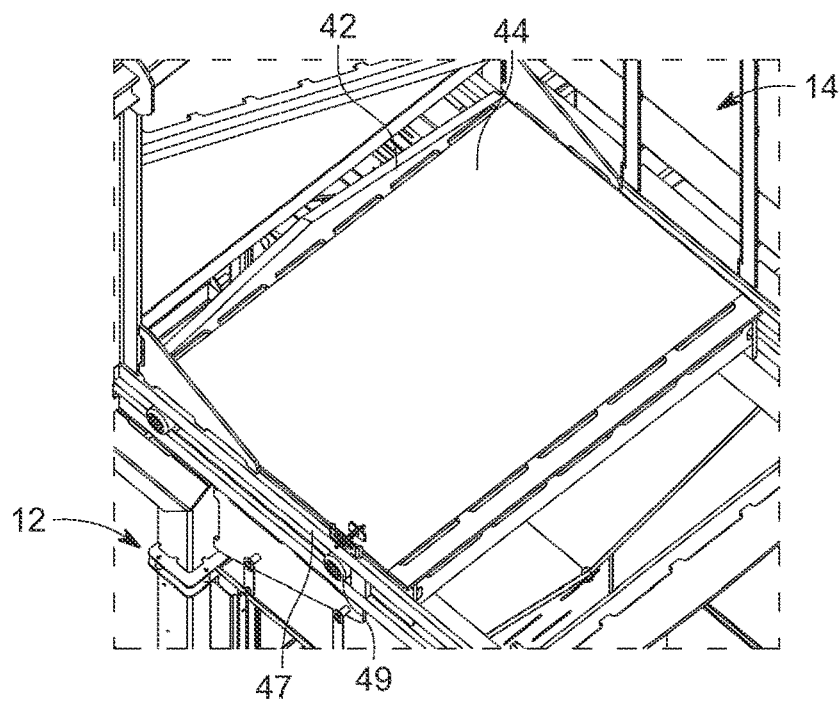
FIGS. 4-6 are perspective views of a cutting apparatus.
Figure 5:
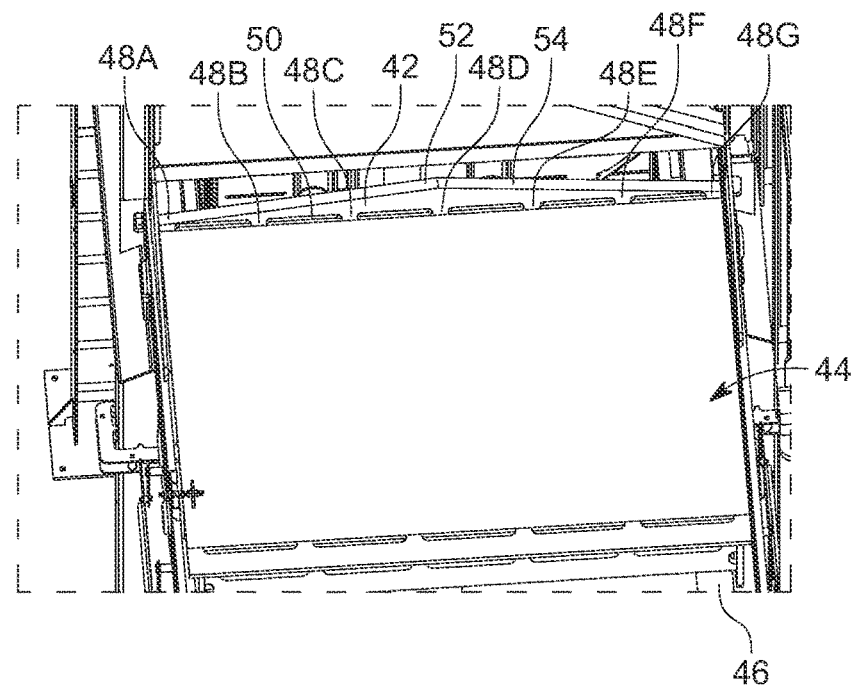
Figure 6:
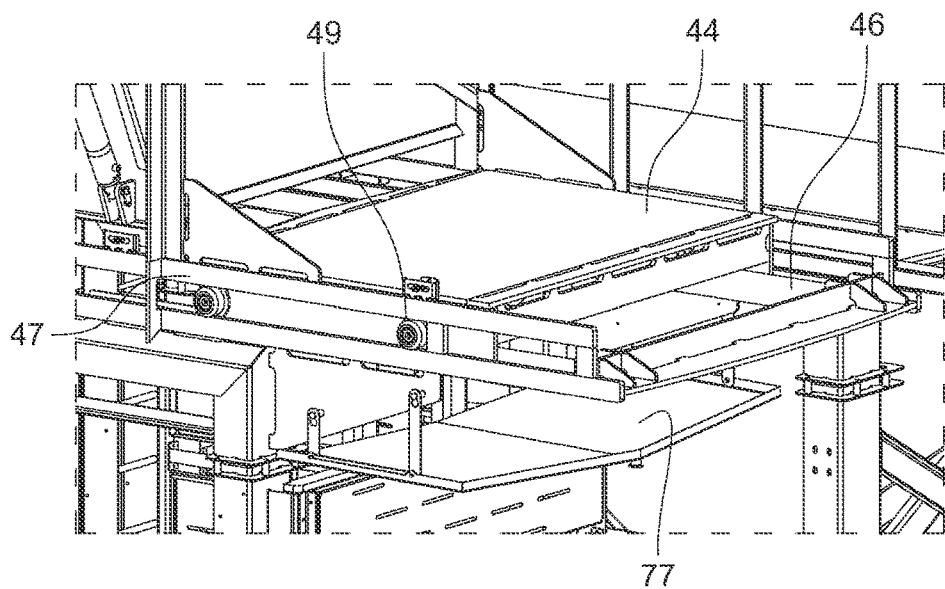

Referring now to FIGS. 4-6 collectively, the cutting member 14 can include a cutting edge or blade 42, a body portion 44 that supports the portion of the blocks, and a drive mechanism 46 for moving the body portion 44. In one embodiment, the cutting member 14 can translate horizontally, and perpendicularly to the blocks 30. The cutting member 14 slides on tracks, such as track 47 using wheels (such as wheel 49) that are mounted onto the body portion 44. While not shown, it will be understood that the cutting 16 member 14 can include two wheels on one side of the body portion 44 and two additional wheels on the opposing side of the body portion 44. These wheels travel inside two distinct, opposing tracks. Each set of wheels, and thus each side of the cutting member 14 is provided with a drive mechanism, such as drive mechanism 46. Again, a drive mechanism 46, such as a hydraulic member, a motor, a chain drive, or other mechanism can be used interchangeably. As the drive mechanism 46 is engaged, the wheels 49 travel in the tracks to move the cutting member 14 to cut the blocks 30. The drive mechanism 46 can be of sufficient strength to drive the cutting member 14 through the blocks, again which is frozen.

The blade 42 can be joined to the body portion 44 via attachment points such as attachment points 48A-48G. For example, the blade 42 can be welded to the body portion 44. The blade 42 is spaced apart from the body portion 44 to form apertures, such as aperture 50, between the cutting edge and the body portion 44. Similar apertures can be located on an opposing end of the body portion 44 from the blade 42.

These apertures reduce friction between the blade and the blocks 30 and also function to allow the cutting member to be cleaned easily. Also, since the blade 42 may become damaged over time due to encountering frozen blocks, the welded or otherwise anchored relationship between the blade and the body portion allows the blade to be removed and replaced as needed. To be sure, fewer or more attachment points can be used than those described.

In some instances, the blade 42 can be wedge-shaped to a point 52. The blade 42 is angled from its cutting edge 54 to the height of the body portion 44. This geometrical configuration allows the blade 42 to cut the blocks. The portion removed from the blocks 11 can travel up the blade 42 and onto the body portion 44 due to the angle of the blade 42.

Once the portion is removed from the blocks, it is supported by the body portion 44. That is, the body portion 44 becomes a temporary floor for the cutting enclosure 16 (see FIG. 1 and FIG. 7 as examples). As noted, when the cutting member 14 is extended, the body portion 44 is approximately level with a floor 56 of the batch enclosure 22. Stated otherwise, the body portion is coplanar with a bottom of the batch enclosure, which allows the first plate 18 (see FIG. 1, FIG. 7, and FIG. 11 as examples) to push the portion out of the cutting enclosure 16 and off of the body portion 44, into the batch enclosure 22.

Figure 7:
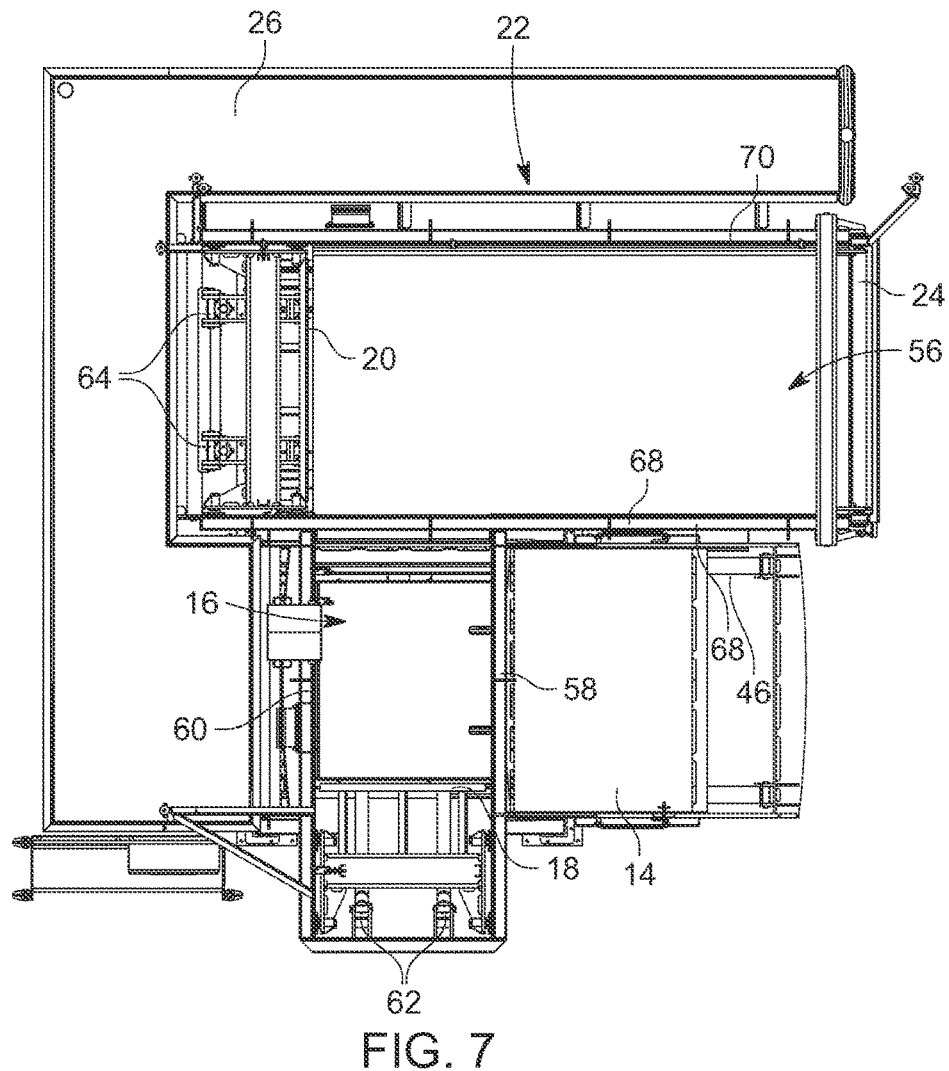
FIG. 7 is a top-down view of the apparatus.
Figure 8:
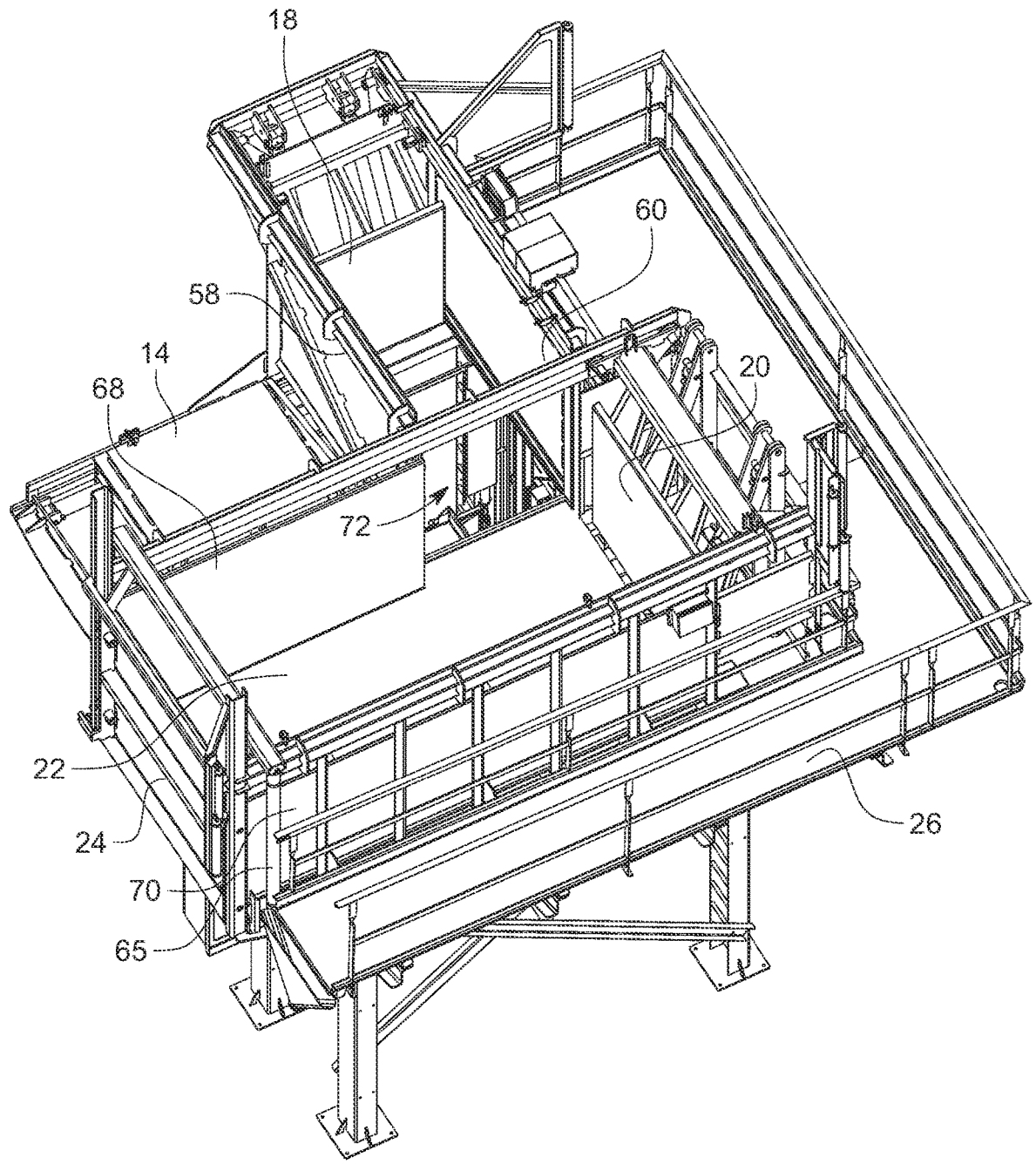
FIG. 8 is a rear perspective view of the apparatus.

Referring now to FIGS. 7 and 8, in some embodiments, the cutting enclosure 16 is defined by sidewalls 58 and 60 and the first plate 18. This cutting enclosure 16 keeps the portion that is removed from the blocks 30 contained temporarily. Again, the body portion 44 can act as a temporary floor for the cutting enclosure 16. In one example embodiment, the first plate 18 is moved horizontally by drive mechanisms 62, which includes hydraulic pistons. Again, these are examples of mechanisms that can be used to move the first plate 18 are not intended to be limiting.

According to some embodiments, after the portion of the blocks has been separated, the first plate 18 can push the separated portion from the cutting enclosure 16 into the batch enclosure 22. The remainder of the blocks can be returned to the loading height by lowering the elevator 34 (FIG. 1) and removing the remainder. It will be understood that in many instances, different portions of different types of frozen products can be separated this way and collected in the batch enclosure 22.

Once one or more blocks have been processed (having portions removed by the cutting member 14), the portions that reside in the batch enclosure 22 can be moved out of the batch enclosure 22 with the second plate 20. As with the first plate, the second plate 20 can be moved using any number of drive mechanisms, but one embodiment includes drive mechanisms 64, which includes hydraulic pistons (again, not limiting). In one embodiment, the second plate 20 moves perpendicularly to the direction of travel of the first plate 18.

The batch enclosure 22 also comprises two sidewalls 68 and 70 that cooperate with the floor 56. The door 24 is located at a terminal end of the batch enclosure 22, opposite the second plate 20. In some embodiments, the door 24 at the terminal end of the batch enclosure 22 can be actuated to open and allow the contents of the batch enclosure 22 to be transferred out of the batch enclosure 22 for further processing. For example, a drive mechanism 65 can be actuated to open and/or close the door 24. In some instances, the sidewall 68 of the batch enclosure 22 has an opening 72 that allows the first plate 18 to push a portion that is separated from the frozen blocks into the batch enclosure 22. Also, when the first plate 18 is extended, the first plate 18 can occupy this opening 72 to prevent the separated portion(s) from being pushed through the opening 72 when the second plate 20 begins the process of pushing the separated portion(s) out of the batch enclosure 22. That is, the first plate 18 temporarily becomes a part of the sidewall 68.

The batch enclosure 22 is elevated above the product receptacle 12 and the cutting member 14 using structural supports or legs. To provide access to the suspended portions of the apparatus, the scaffold platform 26 extends around a portion of the periphery of the apparatus. In one embodiment, the scaffold platform 26 extends around an outside of the sidewall 70 of the batch enclosure 22, around the second plate 20, as well as the sidewall 60 of the cutting enclosure 16.

Referring back to FIG. 6, the apparatus can include a catch plate 77 positioned underneath the cutting member 14 and outside the periphery of the product receptacle. The catch plate 77 is configured to direct loose pieces of the frozen product back into the product receptacle. For example, the catch plate 77 is slightly V-shaped to direct loose pieces of the frozen product toward a midline of the catch plate 77 and ultimately into the product receptacle.

Figure 9:
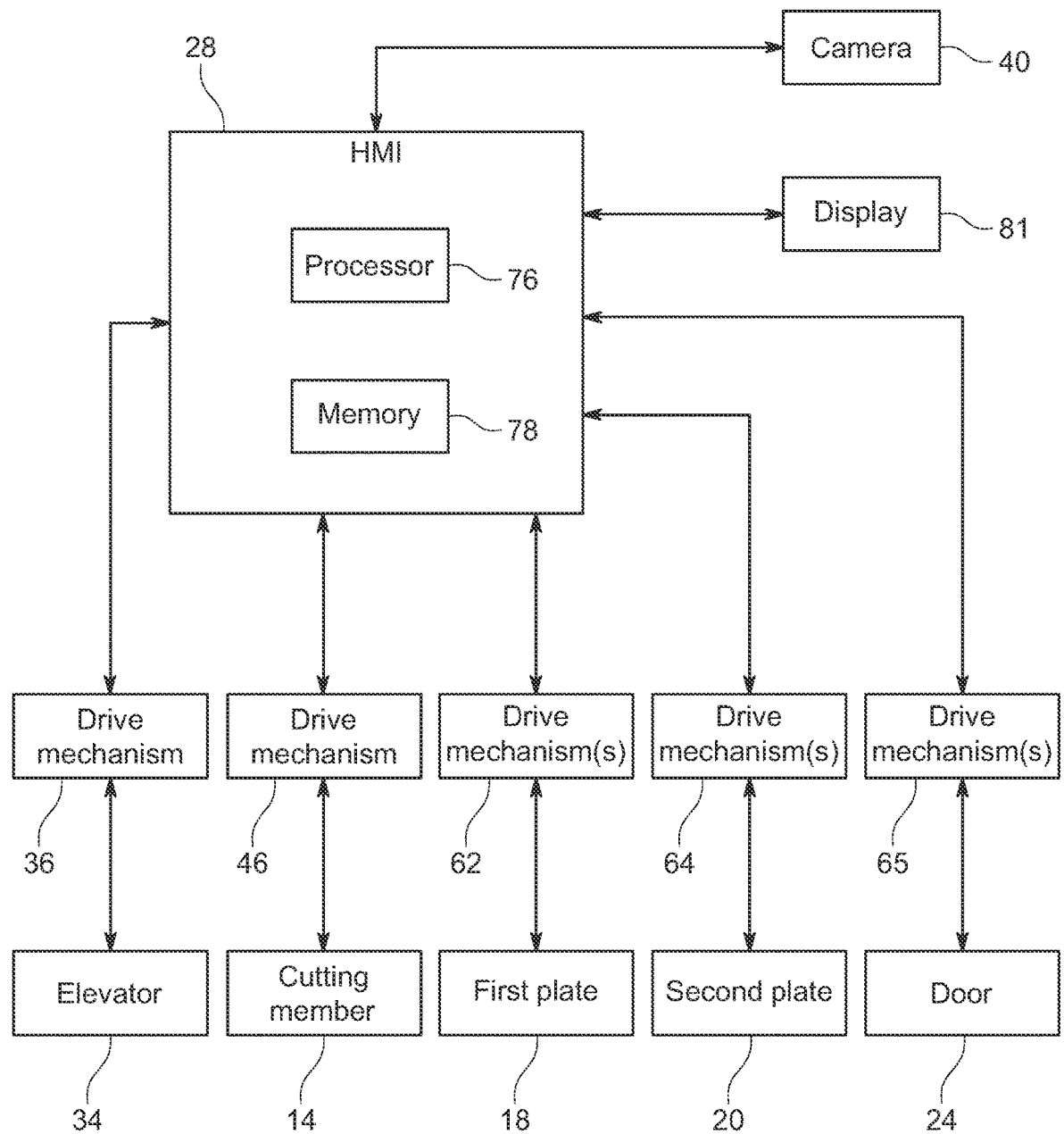
FIG. 9 is a schematic diagram of an example human-machine interface.

Referring now to FIG. 9 (as well as the drawings collectively), as noted, many of the mechanically driven components of the apparatus 10 can be controlled by the HMI 28. The HMI 28 includes a processor 76 and memory 78. The HMI 28 includes a display 81 that receives a video feed from the camera 40.

In some embodiments, the HMI 28 can receive input from a user using virtual or physical input devices. As noted above, a user could select a gross cutting height for the frozen blocks in one example. The user could input a cutting height into the HMI 28 and the HMI 28 can cause the drive mechanism coupled to the elevator 34 to actuate and move the elevator 34 to the selected cutting height.

The user can fine-tune this position with additional input, based on the video feed from the camera. After the cutting height has been fine-tuned (if needed), the HMI 28 can cause the drive mechanism of the cutting member 14 to actuate and cause the cutting member 14 to cut through the blocks, removing a portion thereof.

The HMI 28 can cause the cutting member 14 to stay in an extended position until the portion of the blocks that has been removed is pushed into the batch enclosure 22 by the first plate 18. Again, once the cutting member 14 has moved to its furthest extended position, the HMI 28 can cause the drive mechanism 62 associated with the first plate 18 to actuate and extend the first plate 18, causing the separated portion of the blocks to be moved from the cutting member 14 to the batch enclosure 22.

Once the separated portion is in the batch enclosure 22, the HMI 28 can cause the drive mechanism 64 associated with the second plate 20 to move the products currently in the batch enclosure 22 out of the batch enclosure 22. The HMI 28 can cause the first plate 18 to remain in an extended configuration until the second plate 20 has pushed the product out of the batch enclosure 22. Also, the HMI 28 can cause a drive mechanism 65 associated with the door 24 to actuate and lift the door 24. It will be understood that the door 24 can also be opened manually.

C. Operation of Preferred Embodiment

Figure 10:
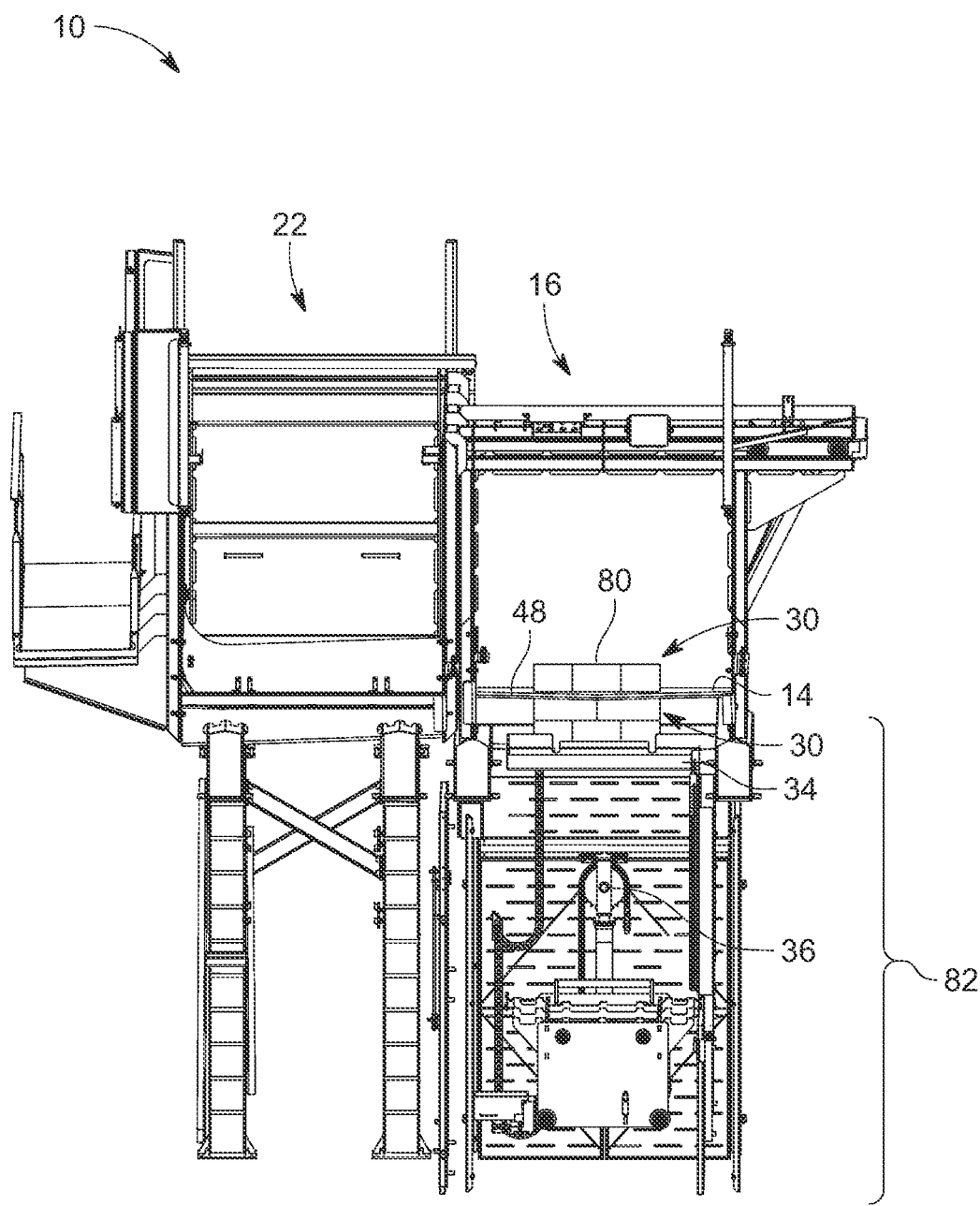
FIG. 10 is a cross-sectional view of the apparatus engaging in a cutting operation on a block.
Figure 11:
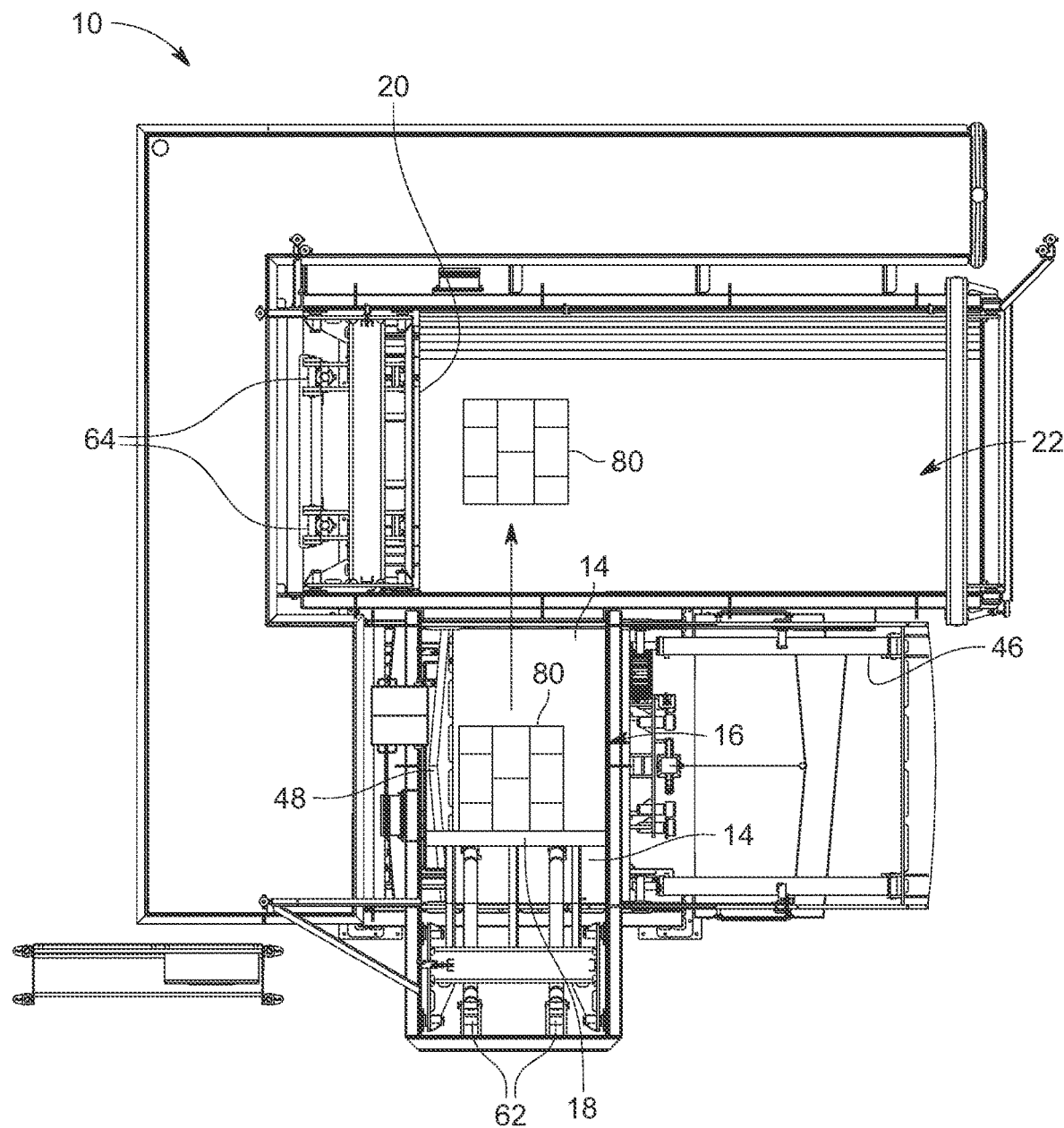
FIGS. 11-12 are top-down views of the apparatus showing additional operations where a portion of the blocks is being pushed into and out of a batch enclosure.
Figure 12:
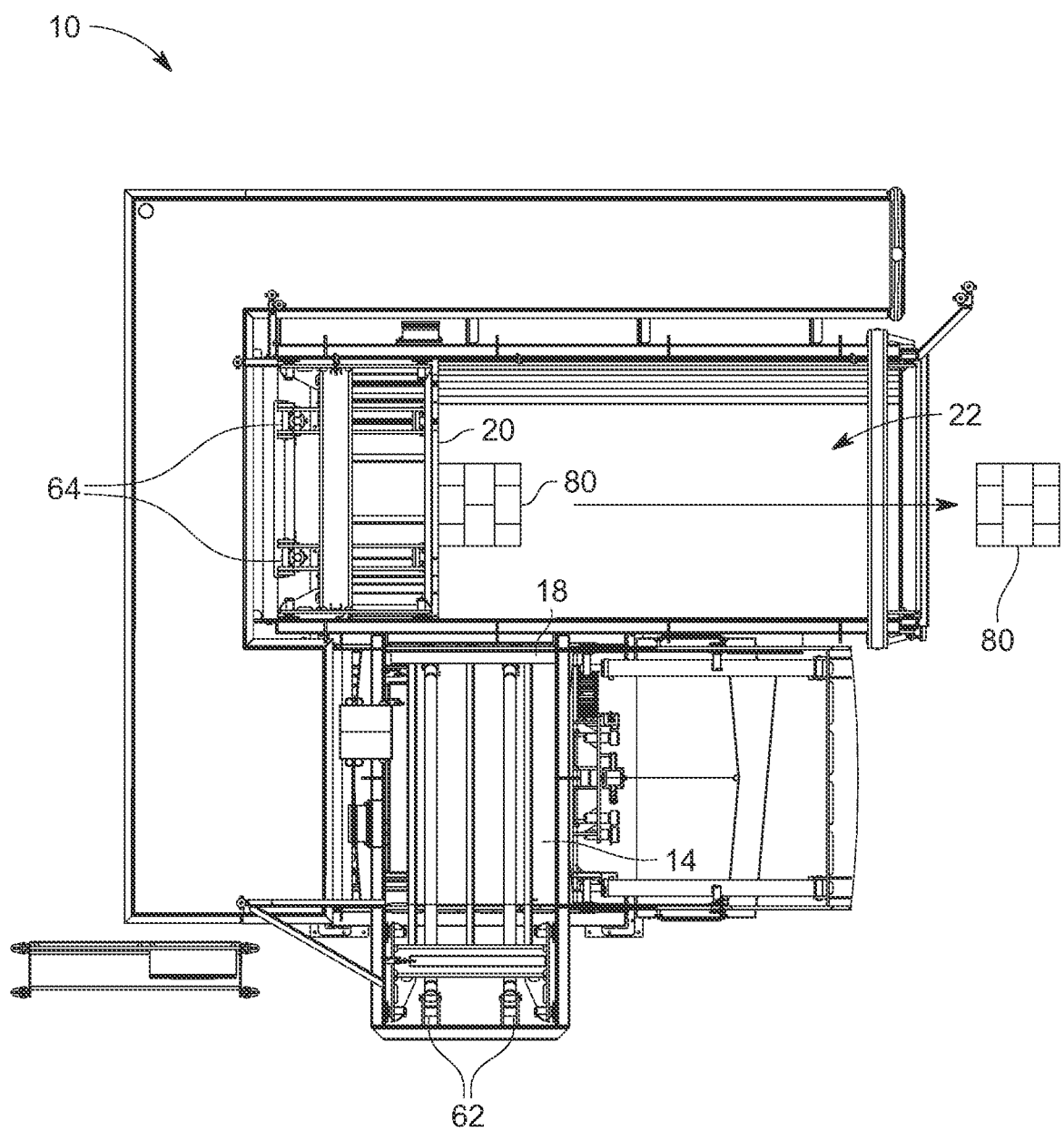

Referring now to FIGS. 10-12 (again with reference to the drawings collectively), in use, the apparatus 10 can be loaded with blocks 30 of a frozen food product. The blocks 30 are loaded into the product receptacle 12 when the product receptacle 12 is at a loading height, and the blocks 30 can be positioned on the elevator 34. A user can determine a gross cutting height for the blocks 30 based on a size or weight of the blocks 30. The user can select the cutting height for the elevator 34 based on the blocks 30 relative to height indicia located in the product receptacle 12.

The user can enter a gross cutting height for the blocks 30 into an HMI 28 (FIG. 1 and FIG. 9) of the apparatus 10. Once received, the HMI 28 can activate a drive mechanism 36 associated with the elevator 34 to raise the blocks 30 to the cutting height 82. A video feed is obtained by the camera 40 (FIG. 9) and presented on a display of the HMI. The user can view the feed and fine-tune the cutting height 82 of the blocks 30.

Once the cutting height 82 of the blocks 30 is achieved, the HMI 28 can actuate the drive mechanism 46 associated with the cutting member 14 to cause the cutting member 14 to extend and cut a portion 80 from the blocks 30. The portion 80 is then supported on the cutting member 14. The HMI 28 can engage the drive mechanism 62 of the first plate 18 to cause the first plate 18 to extend and push the portion 80 into the batch enclosure 22. The HMI 28 can cause the first plate 18 to extend when the cutting member 14 has been fully extended and the portion 80 is resting upon the cutting member 14. In some embodiments, the first plate 18, when extended, covers an opening of the batch enclosure 22.

Again, the foregoing method can be repeated for additional blocks to add other various products to the batch enclosure 22. This allows a combination of frozen products to be aggregated in the batch enclosure 22. Once one or more portions are in the batch enclosure 22, the HMI 28 can activate the drive mechanism 64 of the second plate 20 to push the one or more portions out of the batch enclosure 22. Again, the HMI 28 can also open a door 24 associated with the batch enclosure 22, when a door is present.

While various embodiments have been described above, it should be understood that they have been presented by way of example only, and not limitation. The descriptions are not intended to limit the scope of the technology to the particular forms set forth herein. To the contrary, the present descriptions are intended to cover such alternatives, modifications, and equivalents as may be included within the spirit and scope of the technology as defined by the appended claims and otherwise appreciated by one of ordinary skill in the art. The various embodiments of the present disclosure may be embodied in other specific forms without departing from the spirit or essential attributes thereof, and it is therefore desired that the various embodiments in the present disclosure be considered in all respects as illustrative and not restrictive. Thus, the breadth and scope of a preferred embodiment should not be limited by any of the above-described exemplary embodiments.

Unless otherwise defined, all technical and scientific terms used herein have the same meaning as commonly understood by one of ordinary skill in the art to which this invention belongs. All patent applications, patents, and printed publications cited herein are incorporated herein by reference in their entireties, except for any definitions, subject matter disclaimers or disavowals, and except to the extent that the incorporated material is inconsistent with the express disclosure herein, in which case the language in this disclosure controls. Any headings utilized within the description are for convenience only and have no legal or limiting effect.

What is claimed is:

1. An apparatus, comprising:
   a frozen food product receptacle that supports a frozen food product in a frozen block configuration;
   a processor;
   an elevator having a first drive mechanism, wherein the elevator is capable of lifting a weight greater than 100 pounds, and wherein the first drive mechanism vertically moves the elevator, responsive to a first instruction received from the processor, to raise and lower the frozen food product receptacle and the frozen food product supported by the frozen food product receptacle between a loading height and a cutting height;
   a cutting member having a second drive mechanism, wherein the second drive mechanism moves the cutting member horizontally to remove a portion of the frozen food product, responsive to a second instruction received from the processor, when the frozen food product is at the cutting height; and
   a first plate having a third drive mechanism, wherein the third drive mechanism causes the first plate to push the portion of the frozen food product in a first direction away from the frozen block responsive to a third instruction received from the processor.

2. The apparatus of claim 1, further comprising a second plate having a fourth drive mechanism, wherein the fourth drive mechanism causes the second plate to push the portion of the frozen food product in a second direction that is different from the first direction responsive to a fourth instruction received from the processor.

3. The apparatus of claim 1, wherein the cutting member comprises a cutting edge connected to a body portion, wherein the body portion supports the portion of the frozen food product during and subsequent the removal of the portion of the frozen food from the frozen food product.

4. The apparatus of claim 3, wherein the cutting edge is spaced apart from the body portion and joined to the body portion at attachment points that form apertures between the cutting edge and the body portion.

5. The apparatus according to claim 4, wherein the body portion is coplanar with a bottom of a batch enclosure of the apparatus.

6. The apparatus of claim 1, further comprising indicia printed inside the product receptacle that indicate to a user a plurality of selectable cutting heights, the cutting height being chosen from the plurality of selectable cutting heights, wherein the cutting height is based on a size of the portion that is to be removed from the frozen product.

7. The apparatus of claim 6, further comprising a camera providing a view of the frozen product once the frozen product has been elevated to the cutting height.

8. The apparatus according to claim 1, wherein the apparatus is constructed from stainless steel.

9. The apparatus according to claim 1, further comprising a catch plate positioned underneath the cutting member and outside of the product receptacle, wherein the catch plate directs loose pieces of the frozen food product back into the product receptacle.

10. The apparatus according to claim 1, wherein the portion of the frozen food product is pushed in the first direction to a batch enclosure of the apparatus.

11. The apparatus according to claim 7, further comprising a human machine interface (HMI) that includes the processor, a memory, and a display that receives the view from the camera.

12. The apparatus according to claim 11, wherein the HMI actuates the opening of a door associated with a batch enclosure of the apparatus responsive to an instruction from the processor.

13. The apparatus according to claim 11, wherein the HMI receives an input from the user that is used to fine tune the cutting height responsive to the view from the camera.

14. An apparatus, comprising:
   a processor that executes instructions stored in a memory;
   a frozen food product elevator having a first drive mechanism, wherein frozen food product elevator is capable of lifting a weight greater than 100 pounds, wherein the first drive mechanism vertically moves a block of a frozen food product between a loading height and a cutting height responsive to a first instruction received from the processor;
   a cutting member having a second drive mechanism, wherein the second drive mechanism moves the cutting member to remove a portion of the frozen food product, responsive to a second instruction received from the processor, when the frozen food product is at the cutting height, wherein the cutting member supports the portion of the frozen food product after cutting;
   a first plate having a third drive mechanism, wherein the third drive mechanism causes the first plate to push the portion of the frozen food product through an opening of a batch enclosure of the apparatus responsive to a third instruction received from the processor; and
   a second plate having a fourth drive mechanism, wherein the fourth drive mechanism causes the second plate to push the portion of the frozen food product out of the batch enclosure responsive to a fourth instruction received from the processor.

15. The apparatus according to claim 14, wherein the second plate moves perpendicularly to the first plate.

16. The apparatus according to claim 14, wherein the first plate covers the opening in the batch enclosure subsequent having pushed the portion of the frozen food through the opening of the batch enclosure.

17. The apparatus according to claim 14, further comprising a human-machine interface (HMI) that includes the processor and memory, wherein HMI:
   receives a user input to select the cutting height.

18. The apparatus according to claim 17, further comprising a display that receives a view from a camera, wherein the HMI receives an additional user input that fine tunes the cutting height.

19. The apparatus according to claim 14, wherein the apparatus is constructed from stainless steel.

20. The apparatus according to claim 14, further comprising a catch plate positioned underneath the cutting member, wherein the catch plate directs loose pieces of the frozen food product back into the elevator.

* * * * *